United States Patent

Tanaka

[11] Patent Number: 5,806,297
[45] Date of Patent: Sep. 15, 1998

[54] RESIN CHAIN HAVING RESIN-MOLDED REINFORCING PLATES

[75] Inventor: Koji Tanaka, Osaka, Japan

[73] Assignee: Tsubakimoto Chain Co., Osaka-Fu, Japan

[21] Appl. No.: 975,050

[22] Filed: Nov. 20, 1997

[30] Foreign Application Priority Data

Dec. 25, 1996 [JP] Japan ................................. 8-346323

[51] Int. Cl.⁶ ........................... F16G 13/02; F16G 13/18; B21L 9/02
[52] U.S. Cl. ................................. 59/5; 474/207
[58] Field of Search ................. 474/206, 207; 59/4, 5, 8

[56] References Cited

U.S. PATENT DOCUMENTS

| 3,646,752 | 3/1972 | Kampfer | 474/207 |
| 3,921,792 | 11/1975 | Anderson et al. | 474/207 |
| 4,724,669 | 2/1988 | Kanehira et al. | 59/4 |
| 4,757,681 | 7/1988 | Matsuno et al. | 59/5 |

FOREIGN PATENT DOCUMENTS

| 246235 | 6/1987 | Germany | 474/207 |
| 64-45612 | 3/1989 | Japan . | |
| 2-32916 | 9/1990 | Japan . | |

*Primary Examiner*—David Jones
*Attorney, Agent, or Firm*—Armstrong, Westerman, Hattori, McLeland & Naughton

[57] ABSTRACT

A resin chain is provided which includes a reinforcing plate and a resin portion having a contact surface therebetween such that it is difficult to separate the reinforcing plate from the resin portion at the contact surface. The resin chain includes outer plates with pins fitted therein and inner plates with bushings fitted therein. The outer plates and the inner plates are connected to each other in an alternate manner. A first reinforcing plate is a constituent of each outer plate. The first reinforcing plate has a pair of cylindrical front and rear boss portions with pins fitted therein and a flange portion which rises radially from the outer peripheries of the boss portions to connect the paired front and rear boss portions to each other. A second reinforcing plate is a constituent of each inner plate. The second reinforcing plate has a pair of cylindrical front and rear boss portions with bushings fitted therein and a flange portion which rises radially from the outer peripheries of the boss portion to connect the paired front and rear boss portions to each other. Resin is molded along the surfaces of the flange portions front the outer peripheries of the cylindrical boss portions so as to fill up recesses formed between the boss portions and the flange portions. The outer and inner plates are also fabricated in this way.

2 Claims, 3 Drawing Sheets

5,806,297

RESIN CHAIN HAVING RESIN-MOLDED REINFORCING PLATES

TECHNICAL FIELD OF THE INVENTION

The present invention generally relates to a resin chain and more particularly, to a resin chain having at least one of inner plates and outer plates which are each constituted by a resin-molded reinforcing plate for improving the tensile strength and for preventing separation between the reinforcing plate and the resin portion.

BACKGROUND OF THE INVENTION

A resin chain is light-weight and superior in moldability, but sometimes needs reinforcement because it is inferior in strength to a steel chain. Japanese Utility Model Publication No. 32916/90 (JP '916) discloses a conventional resin chain provided with reinforcing plates. According to the conventional resin chain disclosed in JP '916, a resin-molded, flat, reinforcing steel plate is used as each inner plate of an inner link member, wherein the inner link member includes inner plates and a bushing which are combined together integrally.

However, since it is necessary in the conventional resin chain of JP '916 to mold resin while maintaining a predetermined tensile strength of the chain, the thickness of each inner plate becomes larger than the thickness of the inner plate in the chain size defined by Japanese Industrial Standards (JIS). Consequently, the conventional assembling apparatus is unemployable, and it is required to fabricate pins and other components in respective special sizes. Thus, the manufacture of the conventional resin chain is not very economical.

Furthermore, since the reinforcing plates used in the conventional resin chain of JP '916 are each in the form of a flat plate, both fitting force and tensile force are exerted from the pin on both reinforcing plate and resin portion. Steel and resin are different with respect to Young's modulus of elasticity, so if a fitting force acts on the steel and the resin at the time of assembly of the chain or if a repetitive tensile force is exerted thereon from the pin during operation of the chain, the contact surface between the reinforcing plate and the resin portion will undergo a shear force, thus giving rise to the problem that the reinforcing plate and the resin portion are already apt to become separated from each other at the time of assembly.

Further, since the reinforcing plate is a flat plate, the fluidity of molten resin is impeded at the outer edge of the reinforcing plate, and the resulting inclusion of air causes a cavity to be formed between the reinforcing plate and the resin portion. Consequently, the adhesion between the reinforcing plate and the resin portion is deteriorated and it becomes easy to separate the resin portion from the reinforcing plate.

It is an object of the present invention to provide a resin chain having resin-molded reinforcing plates capable of ensuring a predetermined tensile strength, while conforming of Japanese Industrial Standards (JIS), by improving the shape and size of the reinforcing plates.

It is another object of the present invention to provide a resin chain having a reinforcing plate that does not easily separate from a resin portion by further improving the shape of the reinforcing plates.

SUMMARY OF THE INVENTION

The present invention has solved the above-mentioned problems by providing a resin chain wherein at least one of outer plates, having pins fitted therein, and inner plates, having bushings fitted therein, are each constituted by a resin-molded reinforcing plate. The reinforcing plate has a pair of cylindrical front and rear boss portions with anyone of pins and bushings fitted therein and a flange portion rising radially from the outer peripheries of the boss front and rear portions to connect the paired front and rear boss portions with each other. The resin is molded along the flange portion from the outer peripheries of the front and rear boss portions of the reinforcing plate.

Further, for improving the fluidity of molten resin during molding of the resin, it is preferable that a corner portion, between each front and rear boss portions, and the flange portion, be formed by an arcuate curved surface and that an outer edge of the flange portion be formed also by an arcuate curved surface.

In assembling a chain by inserting pins into the outer plates and inserting bushings into the inner plates, a fitting force, namely a vertical stress, acts mainly on the front and rear boss portions of the reinforcing plates. Since the front and rear boss portions are each cylindrical, the vertical stress acting on each fitting surface becomes lower and the fitting force becomes larger. In addition, since the resin portion is not exposed the fitting surface, it is difficult for separation of occur between the reinforcing plate and resin portion, even if the reinforcing plate and resin portion are made of materials differing in Young's modulus of elasticity.

Also, while the chain is used in operation, the tensile force of the chain is transmitted to the link members of the chain mainly through the front and rear boss portions and the flange portions. In the resin chain of the present invention, therefore, although the outer plates and inner plates used therein are each constituted by a resin-molded reinforcing plate, it is difficult for a shear force to act on the contact surface between the reinforcing plate and the resin portion.

Moreover, since the tensile force of the chain is transmitted to the link members mainly through the reinforcing plates, it is not necessary to thicken the outer plates and/or the inner plates to ensure a predetermined strength. However, it is possible to fabricate the outer plates and/or the inner plates of a thickness conforming to Japanese Industrial Standards (JIS) and hence, it is possible to utilize the conventional manufacturing equipment in assembling the chain.

Further, since each corner portion and outer edge referred to above are formed by arcuate curved surfaces, the fluidity of molten resin at the corner portion and outer edge are improved when molten resin is molded to each reinforcing plate. Consequently, it is possible to prevent the formation of a cavity in the resin portion caused by the inclusion of air and hence, it is possible to fabricate an outer plate and/or an inner plate to form a reinforcing plate in close contact with a resin portion. Therefore, even if a fitting force or a tensile force acts on the reinforcing plate during assembly or operation of the chain, it is difficult to separate the reinforcing plate from the resin portion at the contact surface.

BRIEF DESCRIPTION OF THE DRAWING FIGURES

DETAILED DESCRIPTION OF THE INVENTION

Figure 1:
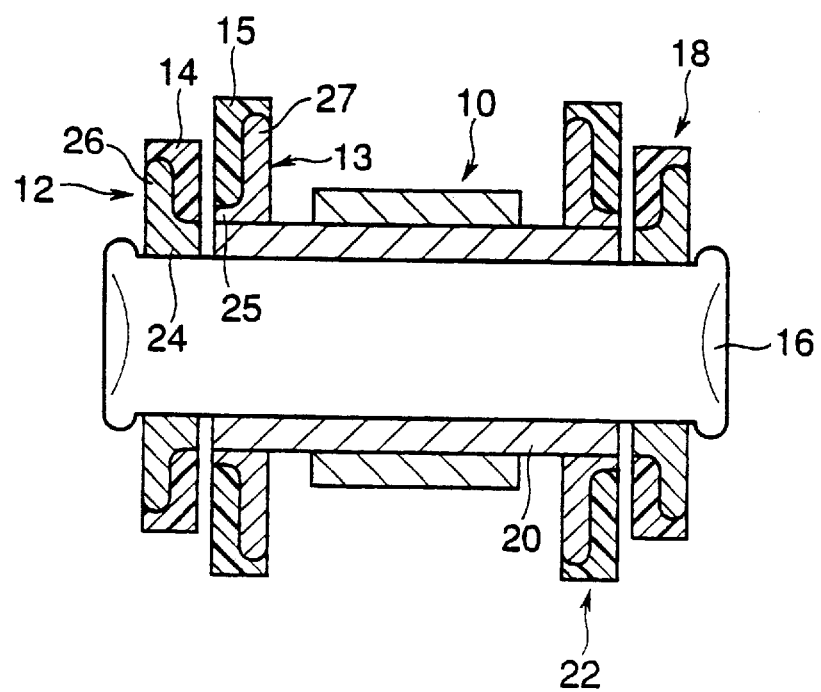
FIG. 1 is a cross-sectional view of a resin chain according to a first embodiment of the present invention.

A resin chain 10 according to an embodiment of the present invention will now be described with reference to the drawing figures. FIG. 1 is a cross-sectional view of the resin chain 10 having resin-molded reinforcing plates 12 and 13. In the resin chain 10, outer plates 18, with pins 16 fitted therein, and inner plates 22, with bushings 20 fitted therein, are connected together in an alternating manner. Each outer plate 18 and each inner plate 22 are constituted by resin-molded reinforcing plates 12 and 13, respectively. Either the outer plates 18 or the inner plates 22 may be constituted by such resin-molded reinforcing plates. Further, it is optional whether resin portions 14 and 15, molded to the reinforcing plates 12 and 13, are to be positioned outside or inside each outer plate 18 and each inner plate 22, respectively.

The reinforcing plate 12 of each outer plate 18 has a pair of cylindrical front and rear boss portions 24, with pins 16 fitted therein, and a flange portion 26 rising radially from the outer peripheries of the front and rear boss portions 24 to connect the paired front and rear boss portion 24 with each other. The reinforcing plate 13 of each inner plate 22 has a pair of cylindrical front and rear boss portions 25, with bushings 20 fitted therein, and a flange portion 27 rising radially from the outer peripheries of the front and rear boss portions 25 to connect the paired front and rear boss portions 25 with each other. The flange portions 26 and 27 in the embodiment rise radially outwardly from the outer peripheries of one end of each of front and rear boss portions 24 and 25, respectively. Thus, as compared with plates conforming to Japanese industrial Standards (JIS), the reinforcing plates 12 and 13 each have a recess. Resin is molded along the surfaces of the flange portions 26 and 27, from the outer peripheries of the cylindrical front and rear boss portions 24 and 25, so as to fill up the recesses. In this way, each outer plate 18 and inner plate 22 is fabricated.

Figure 2:
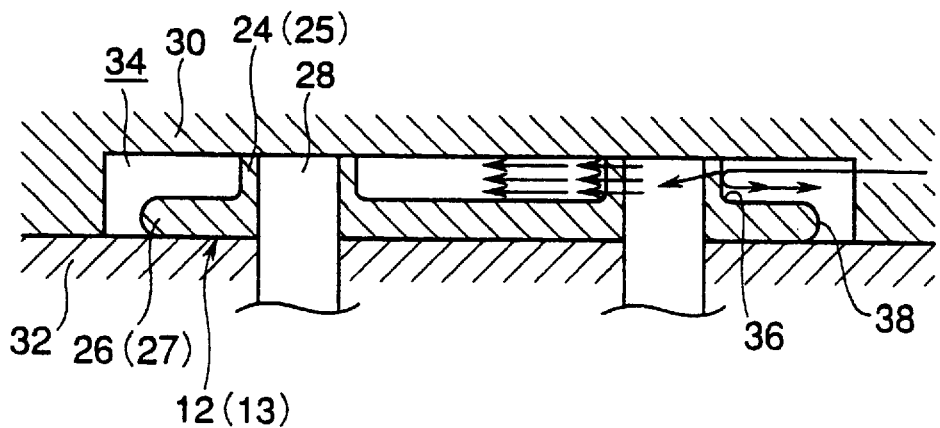
FIG. 2 is a cross-sectional view of a reinforcing plate and molds used in the fabrication of an outer plate or an inner plate.
Figure 3:
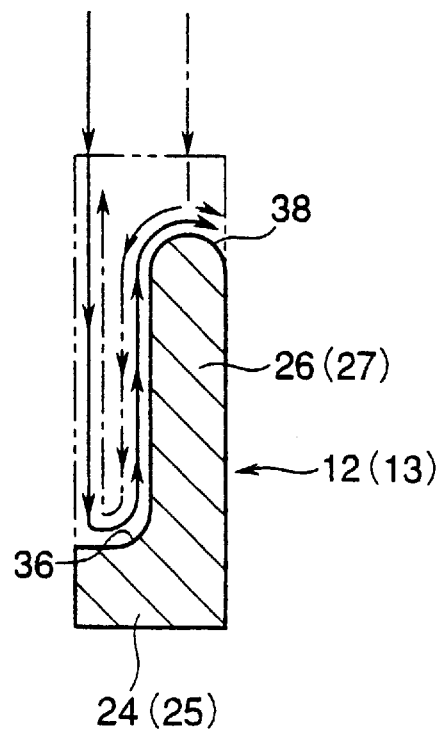
FIG. 3 is a cross-sectional view showing in what manner molten resin flows relative to the reinforcing plate.

FIG. 2 illustrates a method for fabricating such outer plate 18 or inner plate 22. For example, as to the outer plate 18, the reinforcing plate 12 is disposed inside an upper mold 30, provided with pins 28, and a lower mold 32. Molten resin is poured into a cavity 34, whereby the resin is molded to the reinforcing plate 12. For enhancing the adhesion between the reinforcing plate 12 and the resin portion 14 and for preventing separation of the two at the contact surface, it is preferable that a corner portion 36 between each front and rear boss portion 24 and the flange portion 26 be formed by an arcuate curved surface and that an outer edge 38 of the flange portion 26 also be formed by an arcuate curved surface. When molten resin is poured into the cavity 34, as shown in FIG. 3, the molten resin flows smoothly along the surfaces of the molds and the reinforcing plate 12 to fill up the cavity 34. Then, after cooling, the outer plate 18 is removed from the molds. The outer plate 18 thus obtained is as shown in FIG. 1. The dotted line in FIG. 3 indicates how resin flows when molten resin is poured from a different gate. Thus, as can be seen from either solid or dotted lines of resin flow shown in FIG. 3, it is difficult to form a cavity in the resin portion regardless of the gate position.

Since the corner portion 36 and outer edge 38 are each formed by an arcuate curved surface, the fluidity of molten resin is improved and hence the formation of a cavity, caused by the inclusion of air at the corner portion 36 and outer edge 38, can be suppressed. Thus, the adhesion between the reinforcing plate 12 and the resin portion 14 is improved. Further, since the resin portion 14 straddles the outer edge 38 of the reinforcing plate 12 along the arcuate curved surface, the adhesion between the reinforcing plate 12 and the resin portion 14 is also improved thereby.

The chain 10 is fabricated by inserting the pin 16 into each bushing 20 fitted in the inner plates 22 and thereafter fitting both ends of the pin 16 into the outer plates 18. The front and rear boss portions 24 and 25 of the reinforcing plates 12 and 13, which constitute each outer plate 18 and each inner plate 22, respectively, in this embodiment, are cylindrical and the resin portions 12 and 13 are not exposed to the fitting surface. Therefore, the outer plates 18 and the inner plates 22 can be firmly fitted on the pin 16 and the bushing 20, respectively. Besides, since a stress does not act directly on the resin portions 14 and 15, it is possible to prevent separation between the reinforcing plates 12, 13 and the resin portions 14, 15 at the time of assembling the chain 10.

During operation of the chain 10, a tensile force acts on the fitting surface, but the tensile force of the chain scarcely acts on the resin portions 14 and 15, and is transmitted to each link member mainly through the front and rear boss portions 24, 25 and the flange portions 26, 27, thus also making it possible to prevent separation between the reinforcing plates 12, 13 and the resin portions 14, 15.

Figure 4:
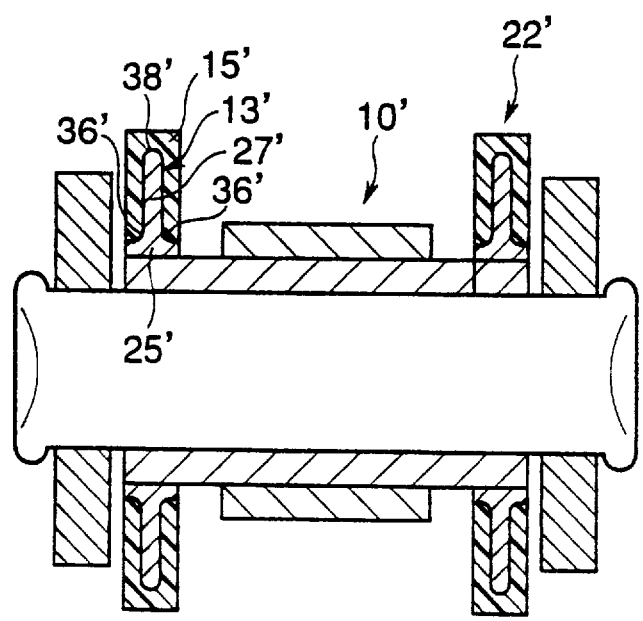
FIG. 4 is a cross-sectional view of a resin chain according to a second embodiment of the present invention.

FIG. 4 illustrates a resin chain 10' according to another embodiment of the present invention, in which only inner plates 22' are each constituted by a resin-molded reinforcing plate 13'. The reinforcing plate 13' comprises cylindrical front and rear boss portions 25' and a flange portion 27' rising radially outwardly from the centers of the outer peripheries of the boss portions 25'. Two corner portions between each of the front and rear boss portions 25' and the flange portion 27', as well as an outer edge 38' of the flange portion 27', are constituted by arcuate curved surfaces, respectively. A resin portion 15' is formed in a shape which straddles the outer edge 38' of the reinforcing plate 13' and covers both inside and outside of the outer edge. With this construction, the fluidity of molten resin is improved and the formation of a cavity in the resin portion 15' is prevented. Further, since the resin portion 15' straddles the outer edge 38', it is possible to prevent the resin portion 15' from separating from the reinforcing plate 13'.

According to the invention, since the reinforcing plate is composed of a pair of cylindrical front and rear boss portions, and a flange portion which connects the paired front and rear boss portions with each other, it is possible to increase the fitting force in assembling the chain and thereby strengthen the chain and improve the service life thereof.

Moreover, during assembly and operation of the chain, since the fitting force and tensile force from each pin or bushing acts mainly on the associated front and rear boss portion of each reinforcing plate and does not act directly on the resin portion, it is difficult for separation of the reinforcing plate and the resin portion to occur at the contact surface, even in the event of different strains due to a difference in Young's modulus of elasticity between the materials of the reinforcing plate and the resin portion, thus also contributing greatly to the improvement in service life of the chain.

Further, since the tensile force of the chain acts directly on the reinforcing plate through the flange portion, it is not necessary to thicken the reinforcing plate despite the plate being a resin-molded plate, but it is possible to follow the thickness of the outer plate and/or the inner plate conforming to Japanese Industrial Standards (JIS) and the conventional manufacturing equipment can be utilized for assembling the chain.

Further, since the tensile force of the chain acts directly on the reinforcing late through the flange portion, it is not necessary to thicken the reinforcing plate despite the plate being a resin-molded plate, but it is possible to allow the thickness of the outer plate and/or the inner plate to conform to Japanese Industrial Standards (JIS) so that the conventional manufacturing equipment can be utilized for assembling the chain.

Further, according to the invention, since the corner portions and the outer edge are formed by arcuate curved surfaces, the fluidity of molten resin is improved during molding of resin to the reinforcing plate and it is difficult to form a cavity caused by the inclusion of air at the corner portions and outer edge. Consequently, the reinforcing plate and the resin portion come closely into contact with each other and separation of the reinforcing plate and the resin portion at a contact surface therebetween is prevented even if an external force is exerted on the reinforcing plate during assembly and operation of the chain. Thus, it is possible to improve the service life of the chain.

I claim:

1. A resin chain comprising:

outer plates with pins fitted therein;

inner plates with bushings fitted therein, wherein at least one of said outer plates and said inner plates are each constituted by a resin-molded reinforcing plate, said reinforcing plate having a pair of cylindrical front and rear boss portions with anyone of pins and bushings fitted therein and a flange portion rising radially from outer peripheries of said front and rear boss portions to connect said front and rear boss portions with each other, and a resin being molded along said flange portion from said outer peripheries of said front and rear boss portions of said reinforcing plate.

2. The resin chain according to claim 1, wherein a corner portion between each of said front and rear boss portions and said flange portion is formed by an arcuate curved surface, and an outer edge of said flange portion is formed by an arcuate curved surface.

\* \* \* \* \*